Oct. 8, 1957          E. K. WAGNER          2,809,333
CONSTANT CHIP THICKNESS MOTOR CONTROL SYSTEM FOR MACHINE TOOLS
Filed Oct. 7, 1952
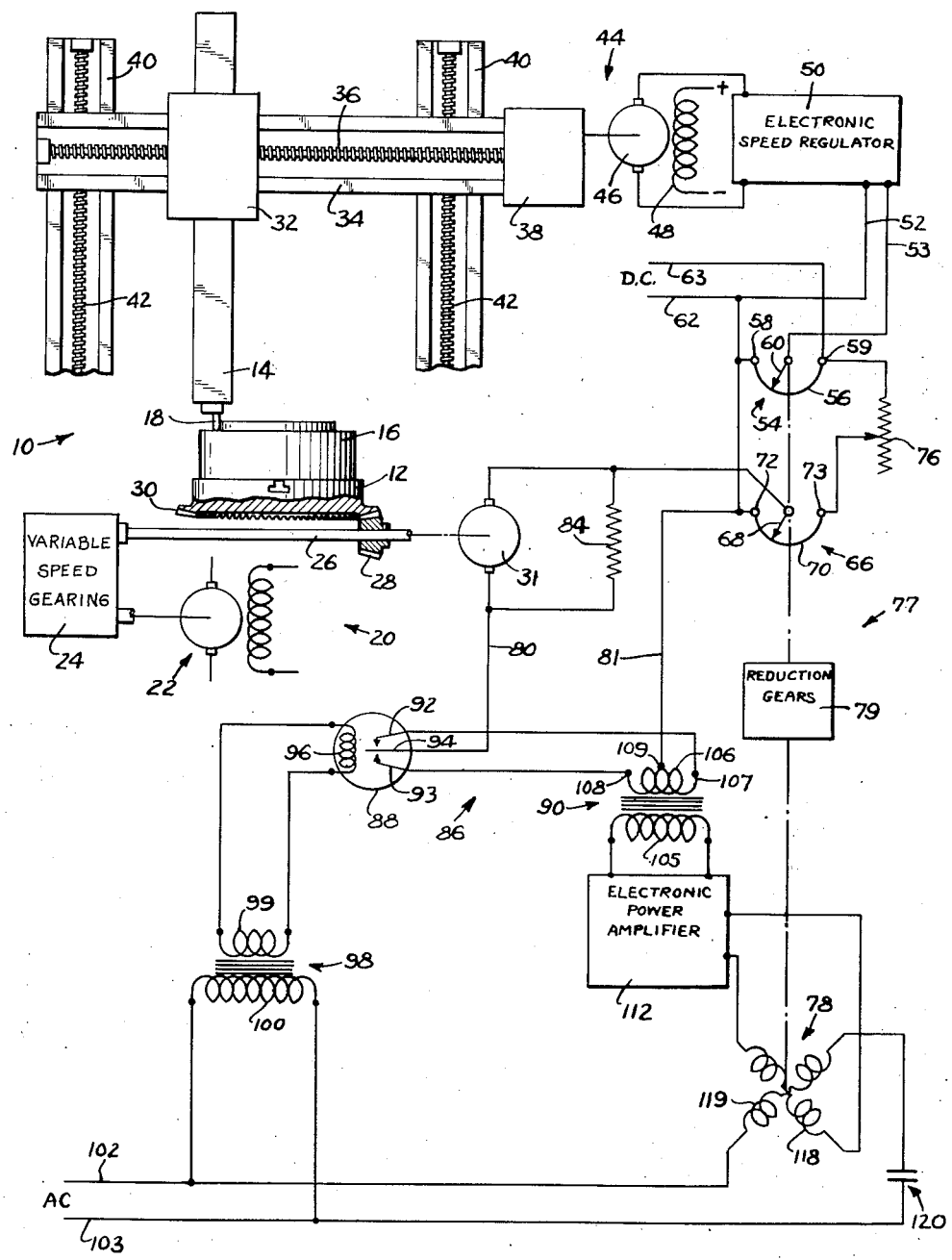
Inventor
ELMER K. WAGNER
by: Carlson, Pitzner, Hubbard & Wolfe
Attys.

United States Patent Office

2,809,333
Patented Oct. 8, 1957

2,809,333

CONSTANT CHIP THICKNESS MOTOR CONTROL SYSTEM FOR MACHINE TOOLS

Elmer K. Wagner, Fond du Lac, Wis., assignor to Giddings & Lewis Machine Tool Company, Fond du Lac, Wis., a corporation of Wisconsin Application October 7, 1952, Serial No. 313,465

10 Claims. (Cl. 318—39)

This invention relates to rotary machine tools, such as vertical boring mills, for example, and particularly to control systems therefor.

The usual rotary machine tool is provided with a main spindle driving mechanism for effecting relative rotation of a workpiece and a cutting tool, together with a feed mechanism for producing relative feeding movement of the tool and the work. It was formerly the usual practice to obtain motive power for the feed mechanism by means of a mechanical driving connection to the spindle drive, and this arrangement is still employed in some cases. For a machine tool of this type, the speed of the spindle drive may be changed without affecting the feed rate per revolution of the work, since the feed rate is determined by the mechanical characteristics of the feed drive. Thus, a machine tool of this type inherently maintains a constant chip thickness, even though the spindle speed is changed while a cut is being taken.

More recently, however, it has become common practice to provide a separate motor for driving the feed mechanism. This arrangement is employed when the machine tool is to be used for contouring operations. With a machine tool of this type, the chip thickness will decrease when the spindle speed is increased, and vice versa, unless a compensatory change is made in the speed of the feed motor. This presents a problem of practical importance because it is common practice to change the spindle speed while a cut is being taken, particularly during a facing cut when the tool is being fed radially, in which case the spindle speed may be varied to maintain constant surface cutting speed between the tool and the work. In my co-pending United States application, Serial No. 255,103, filed November 6, 1951, I have disclosed an invention whereby the table speed is varied automatically in order to maintain constant cutting speed.

It is an object of the present invention to provide an automatic control system for maintaining constant chip thickness in a rotary machine tool having a feed mechanism which is mechanically independent of the main drive mechanism.

A further object is to provide an automatic control system for varying the speed of the feed drive motor in response to variations in the speed of the table drive motor, so as to maintain constant chip thickness.

A further object is to provide an automatic control system for maintaining a constant ratio between the speed of the feed drive motor and the speed of the table drive maintaining a constant ratio between the speed of the feed drive motor and the speed of the table drive motor so that constant chip thickness will be maintained despite variations in the speed of the table motor.

Further objects and advantages of the invention will appear from the following description of an illustrative embodiment, taken with the accompanying drawing in which the single figure is a diagrammatic representation of an illustrative rotary machine tool equipped with a constant chip thickness control system constructed in accordance with the invention.

While the invention is susceptible of various modifications and alternative constructions, there is shown in the drawing and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Considered more particulary, the illustrative embodiment of the present invention, as shown in the drawing, comprises a rotary machine tool in the form of a vertical boring mill 10 provided with a rotatable horizontal worktable 12 and a tool-supporting ram 14. While the work is rotated and the tool is fed in this instance, it will be understood that the invention is equally applicable to rotary machine tools in which the tool is rotated and the work is fed. In the illustrated machine, a workpiece 16 is secured to the table 12, and a cutting tool 18 is mounted on the ram. The table 12 is provided with a variable speed drive 20 comprising a variable speed motor 22 which may be of the direct current shunt field type as shown. Connected to the motor is a speed change transmission 24 which drives a shaft 26. A pinion 28, mounted on the latter, meshes with a ring gear 30 on the table 12.

To provide a voltage proportional to the speed of the table 12, a direct current tachometer generator 31 is connected to the shaft 26. The generator may have a permanent field magnet or a separately excited field winding (not shown).

The ram is slidably carried for vertical feeding movement on a saddle 32 which is slidable horizontally along a rail 34. To feed the ram vertically, a suitable mechanism (not shown) is contained in the saddle 32. Horizontal feeding movement of the saddle 32 is effected by means of a feed screw 36 which is operated by a feed mechanism 38 mounted at one end of the rail 34. The latter is slidably mounted on a pair of spaced vertical columns 40 which are provided with lead screws 42 for moving the rail vertically.

The feed mechanism 38 is provided with a variable speed drive which is mechanically independent of the drive for the rotatable table 12. In this instance, the drive for the feed mechanism comprises a direct current motor 44 having an armature 46 and a shunt field 48, the latter being energized (by means not shown) from a suitable constant potential direct current source. The motor is provided with an electronic speed regulator 50 which is connected to the armature 46 as shown. Extending from the regulator 50 are a pair of control leads 52 and 53 which are connected to a movable or adjustable control element, comprising a potentiometer 54 in this instance. The latter has a resistance element 56, with terminals 58 and 59, and a movable slider 60 engaging the resistance element. The terminals 58 and 59 are connected to a pair of power line wires 62 and 63 which extend to a direct current source (not shown). The control leads 52 and 53 are connected to the terminal 58 and the slider 60, respectively.

Since the electronic speed regulator 50 forms no part in itself of the present invention, it will not be shown or illustrated in detail herein. The regulator may be constructed in a conventional manner so that the voltage applied to the armature 46 will be generally proportional to the voltage impressed across the control leads 52 and 53 by the potentiometer 54. It will thus be apparent that the slider 60 of the potentiometer functions as a movable speed control member.

In order to provide a voltage which will be proportional to the speed of the feed motor 44, a potentiometer 66 is ganged with the potentiometer 54. The functions performed by the potentiometer 66 might be performed by the speed regulating potentiometer 54 or by a tachometer generator or the like, but certain advantages arise from the provision of a separate speed indicating potentiometer, as will appear shortly. The potentiometer 66 includes a movable slider 68 which is mechanically connected to the slider 60 of the potentiometer 54. The slider 68 contacts a resistance element 70 having terminals 72 and 73, the former of which is connected directly to the power line wire 62. A variable resistor 76 is connected between the other terminal 73 and the power line wire 63. In its most advantageous form, the potentiometer 66 is so constructed that the voltage between the slider 68 and the terminal 72 will be directly proportional to the speed of the feed motor 44. In a known manner, the potentiometer 66 may be tapered so as to compensate for any non-linearity in the relationship between the speed maintained by the electronic speed regulator 50 and the position of the potentiometer slider 60. Varying the setting of the resistor 76 will change the voltage across the potentiometer 66 and thus alter the factor of proportionality between the speed of the motor and the voltage developed by the potentiometer.

Provision is made for adjusting the speed of the feed motor 44 so as to maintain a constant chip thickness, this being accomplished in the present case by maintaining a constant ratio between the output voltages developed by the tachometer generator 31 and the potentiometer 66. The illustrated arrangement is such as to maintain equality between these voltages. For this purpose, a servo system 77 is provided, comprising a reversible, two-phase induction motor 78, mechanically connected to the potentiometer sliders 60 and 68 by means of speed reduction gearing 79. Thus the speed of the feed motor may be increased or decreased by running the motor 78 in one direction or the other. The arrangement of the servo system is such as to increase the speed of the feed motor when the voltage developed by the tachometer generator 31 exceeds the voltage developed by the potentiometer 66, and vice versa.

In this instance the servo system 77 comprises a pair of input or control leads 80 and 81, across which the tachometer generator and the potentiometer 66 are connected in series opposition. As shown, the control lead 80 is connected to one side of the tachometer generator and the slider 68 is connected to the other side. A load resistor 84 is connected across the tachometer generator. The other control lead 81 is connected to the terminal 72 of the potentiometer 66.

The control leads 80 and 81 are connected in this instance to an inverter 86 which converts the combined direct current signal appearing across the leads into an alternating current signal having a phase polarity corresponding to the polarity of the combined signal. As shown, the inverter comprises a vibratory interrupter 88 and a transformer 90. The interrupter 88 has a pair of fixed contacts 92 and 93 which are alternately engaged by a vibrator reed 94, the latter being connected to the input lead 80. An electromagnet 96 is utilized to excite the reed into vibration. To energize the electromagnet, a transformer 98 is provided, having a secondary winding 99 connected to the electromagnet, and a primary winding 100 connected to a pair of power line wires 102 and 103 extending to an alternating current source (not shown).

The inverter transformer 90 has a secondary winding 105 and primary winding 106, the latter being provided with terminals 107 and 108 which are connected to the fixed contacts 92 and 93 of the interrupter. A center tap 109 on the primary winding is connected to the control lead 81.

The alternating current output of the inverter 86 is utilized to run the motor 78. For this purpose an electronic power amplifier 112 is connected to the secondary 105 of the transformer 90. The illustrated motor has a pair of phase windings 118 and 119, the former of which is connected to the output of the electronic power amplifier. The other winding 119 is connected across the alternating current line wires 102 and 103, through a series-connected phase-shifting capacitor 120. Thus the motor will run in one direction or the other according to the phase polarity of the signal delivered by the power amplifier 112. In the absence of such a signal, the motor will stop.

While apparent from the foregoing, the operation of the illustrative embodiment will be summarized briefly. It will be assumed initially that the worktable 12 is being rotated by the main drive motor 22 and that the saddle 32 is being fed to the right by the feed motor 44. These conditions will exist when the vertical boring mill is being employed to take a facing cut on the workpiece 16. It may further be assumed that the main drive motor and the feed motor are operating at such speeds that the output voltages of the tachometer generator 31 and the potentiometer 66 are equal. Since these voltages are oppositely polarized, the combined voltage across the control leads 80 and 81 will be zero. Under these conditions, the winding 118 of the motor 78 will not be energized by the electronic amplifier 112. As a result the motor 78 will remain stationary.

While the cut is being taken on the workpiece, there may be some occasion for increasing the speed of the main drive motor 22. For example, the speed may be increased to maintain constant surface cutting speed between the cutting tool and the workpiece as the tool is fed radially inward. Any increase in the speed of the rotatable table 12 will tend to decrease the chip thickness unless a compensating increase is made in the speed of the feed motor. Such a compensating effect is brought about by the increase in the tachometer voltage which results from the increase in the table speed. As a result of the increased tachometer voltage, a direct current signal appears across the control leads 80 and 81, having a polarity corresponding to that of the generator 31 since the voltage of the generator predominates over the voltage appearing across the tapped portion of the potentiometer 66. The inverter 86 converts the difference signal from direct to alternating current at the frequency of the voltage across the alternating current line wires 102 and 103. The resulting alternating current signal will be in in-phase or 180 degrees out-of-phase with the voltage across lines 102 and 103, and will change from one phase relation to the other as the polarity of the difference signal changes. After amplification by the amplifier 112, the alternating current signal is applied to the winding 118 of the motor 78. It will be recalled that the other winding 119 is continuously energized from the alternating current line wires 102 and 103. Because of the phase-shifting action of the capacitor 120 a phase difference will exist between the currents in the two windings of the motor 78. As a result the motor will run in a direction such as to increase the speed setting of the potentiometer 54. Because of the speed reduction gearing 79, the potentiometer will be adjusted at a slow rate so as to avoid overloading or over-accelerating the motor 44.

It will be understood that the speed setting of the potentiometer 66 will be increased simultaneously with that of the potentiometer 54. Ultimately this will increase the output voltage of the potentiometer 66 to a value equal to that of the tachometer generator 31. When the two voltages are thus brought into balance, the difference voltage across the control leads 80 and 81 will drop to zero and the motor will stop. The ultimate speed of the feed motor 44 will be such as to restore the initial chip thickness.

It will readily be understood that any decrease in the speed of the table 12 will produce a combined signal across the control leads 80 and 81 of reverse polarity corresponding to that of the voltage from the potentiometer 66. As a result, the motor winding 118 will be energized with an alternating current signal having a reverse phase polarity, and the motor will run in the reverse direction so that the speed settings of the potentiometers 54 and 66 will be decreased. Ultimately the balance will again be restored between the output voltages of the generator 31 and the potentiometer 66, whereupon the motor 78 will come to rest.

By varying the resistor 76 the chip thickness may be changed while the boring mill 10 is operating. This will change the input voltage applied to the potentiometer 66 and thus alter the factor of proportionality between the speed of the feed motor 44 and the output voltage of the potentiometer 66, so that the voltages of the tachometer generator and the potentiometer will be in balance at a different speed of the feed motor. It will readily be understood that the chip thickness might be changed by varying the factor of proportionality between the speed of the table 12 and the output voltage of the tachometer generator 31. This might be accomplished by varying the field strength of the tachometer generator or by providing an adjustable voltage divider or the like in its output circuit. A voltage divider might similarly be employed in the output circuit of the potentiometer 66.

In the illustrative embodiment, the constant chip thickness control system is applied to the mechanism for feeding the saddle, so that constant chip thickness is maintained during facing cuts. However, it will be understood that the invention may equally well be applied to the feed mechanism for the ram 14 so as to obtain constant chip thickness during axial turning and boring operations.

I claim as my invention:

1. In a rotary machine tool having a work support, a tool support, a variable speed drive motor for effecting relative rotation of said supports, and a feed motor for effecting relative feeding movement of said supports, the combination comprising a tachometer generator driven by said drive motor for producing a voltage proportional to the speed thereof, a speed regulating potentiometer, an electronic voltage control unit for varying the speed of said feed control motor in accordance with the setting of said potentiometer, a speed indicating potentiometer adapted for connection to a voltage source and ganged with said speed regulating potentiometer for producing a voltage proportional to the speed of said feed motor, means for combining the output voltages of the tachometer generator and the speed indicating potentiometer in series opposition, a vibratory inverter adapted for connection to an alternating current source and operable to convert the combined voltages of said tachometer generator and said speed indicating potentiometer into an alternating current signal varying in phase with the polarity of the combined voltages, an electronic amplifier for amplifying said signal, a two-phase alternating current motor for adjusting said potentiometers, said two-phase motor having a pair of phase windings, one of said windings being adapted for connection to said alternating current source and the other being connected to the output of said electronic amplifier so that the motor will operate in one direction or the other according to the polarity of said combined voltages, in order to maintain constant chip thickness, and means for varying the magnitude of the voltage supplied from said voltage source to said speed indicating potentiometer to vary the proportionality between the speed of the feed motor and the voltage output of said potentiometer and thus vary the chip thickness.

2. In a rotary machine tool having a work support, a tool support, a variable speed drive motor for effecting relative rotation of said supports, and a feed motor for effecting relative feeding movement of said supports the combination comprising a first potentiometer connected with said feed motor for controlling its speed, means for producing a first voltage proportional to the speed of said drive motor, means including a second potentiometer ganged to said first potentiometer for producing a second voltage proportional to the speed of said feed motor, means for combining said first and second voltages in opposition to each other for producing a combined signal, a two-phase alternating current servo motor for adjusting said potentiometers in unison, said alternating current motor being provided with first and second phase windings, means for energizing said first winding from an alternating current source, means for converting said combined signal into an alternating current signal having the frequency of said alternating current source, a phase dependent upon the polarity of said combined signal, and an amplitude proportional to the magnitude of said combined signal, and means for energizing said second winding with said alternating current signal to operate the alternating current motor in one direction or the other according to the polarity of said combined signal, so that constant chip thickness will be maintained despite variations in the speed of said drive motor.

3. In a rotary machine tool having a work support, a tool support, a variable speed drive motor for effecting relative rotation of said supports, and a feed motor for effecting relative feeding movement of said supports, the combination comprising means for producing a first voltage proportional to the speed of said drive motor, a device including a movable control element for varying the speed of said feed motor, a potentiometer operable by said movable control element for producing a second voltage proportional to the speed of the feed motor, a reversible motor for operating said movable control element, means for combining said first and second voltages in opposition to each other for producing a combined signal which will be zero when said voltages are equal, means responsive to the polarity of said combined signal for operating the reversible motor in one direction or the other according to said polarity to maintain said voltages in equality and thus maintain constant chip thickness, means for supplying an input voltage to said potentiometer, and means for varying said input voltage to change the proportionality between the speed of the feed motor and said second voltage, and thus change the chip thickness which is to be maintained.

4. A system for maintaining constant thickness of chips cut by a tool from a workpiece which are relatively rotated and translated, respectively, by two electric motors, and in which the speeds of said motors are maintained in a constant, selectable ratio by means responsive to the algebraic sum of two opposed electrical signals which are continuously proportional to the speeds of the respective motors; said system being characterized in that one of the motors is energized by a voltage adjustable in response to positioning of a movable control element, and means are provided responsive to the said algebraic sum of the two electric signals for correctively altering the position of said movable element to change the speed of the one motor until said algebraic sum is reduced to zero and the predetermined speed ratio is obtained.

5. A system for maintaining constant thickness of chips cut by a tool from a workpiece which are relatively rotated and translated, respectively, by two electric motors, and which includes means for creating two electric signals continuously proportional to the respective speeds of the two motors, means for oppositely combining said two signals to produce a third signal proportional to their algebraic sum, and means responsive to the third signal for correctively altering the speed of one of said motors to maintain the ratio of the speeds of the two motors at a preselected value; said system being characterized in that said last-named means includes means for deriving from the third signal an alternating signal which changes 180° in phase according to the sign of said third signal and varies in magnitude proportionally to the magnitude of said third signal, a two-phase induction motor having one winding thereof energized from a constant phase alternating current source and the other winding thereof energized by said alternating signal, a potentiometer having a movable member operative upon movement to vary the energizing potential supplied to said one motor, and means connecting said induction motor to the movable member so that the former correctively positions the latter to correctively adjust the energizing potential supplied to said one motor until the speed of the latter is correctively altered to produce the desired preselected speed ratio.

6. The method of maintaining constant thickness of chips produced in a machine tool in which relative rotation and translation between a workpiece and a cutting tool are imported, respectively, by two electric motors, which comprises producing a unidirectional electrical signal of a magnitude which is continuously proportional to deviations from a predetermined value in the ratio of the speeds of the two motors, producing an alternating electric signal proportional in magnitude to and corresponding in phase to the polarity of the unidirectional signal, applying said alternating signal to one winding of a two-phase induction motor, the other winding of which is continuously energized from an alternating current source, and causing the induction motor to position a movable control element which correctively alters the energizing potential which is delivered to one of said first two motors, thereby altering the speed of the one motor until the unidirectional voltage is reduced to zero and the predetermined value of speed ratio is obtained.

7. In a machine tool having a work support and a tool support which are relatively rotatable and translatable, and having first and second electric motors drivingly connected to effect the relative rotation and translation of said supports, respectively, a control system comprising, in combination, means for producing a first D. C. voltage which is proportional in magnitude to the relative rotational speed of said supports, means for producing a second D. C. voltage which is proportional in magnitude to the relative translational speed of said supports, means for combining said first and second voltages in opposition to obtain an error voltage proportional to their algebraic sum, a movable element and means for varying the speed of one of said motors according to the position of said element, and means responsive to said error voltage for adjusting the position of said element and thereby changing the speed of said one motor so as to maintain a selected ratio between the relative rotational and translational speeds of said supports notwithstanding variations in the speed of the other motor.

8. In a machine tool having first and second electric motors drivingly connected to impart relative rotation and translation, respectively, to a work support and a tool support, a control system comprising, in combination, means for producing a first D. C. voltage which is proportional in magnitude to the relative rotational speed of said supports, means for producing a second D. C. voltage which is proportional in magnitude to the relative translational speed of said supports, means for combining said first and second D. C. voltages in opposition to produce an error voltage proportional in magnitude to their algebraic sum, a movable element and means for varying the speed of one of said motors according to the position of said element, means including a motor responsive to said error voltage for adjusting the position of said element and thereby changing the speed of said one motor so as to maintain a selected ratio between the relative rotational and translational speeds of said supports notwithstanding variations in the speed of the other motor, and adjustable electric means for varying the factor of proportionality between one of said D. C. voltages and the corresponding relative speed of said supports, whereby the said maintained ratio of the relative rotational and translational speeds may be adjusted.

9. The method of maintaining constant thickness of chips produced in a machine tool in which relative rotation and translation between a workpiece and a cutting tool are imparted, respectively, by two electric motors, which comprises producing a first D. C. voltage proportional in magnitude to the relative rotational speed of the workpiece and tool, producing a second D. C. voltage proportional in magnitude to the relative translational speed of the workpiece and tool, combining said D. C. voltages in opposition to produce an error voltage proportional to their algebraic sum, and altering the speed of one of said motors to maintain the ratio of relative rotational and translational speed of the workpiece and tool at a selected value by utilizing said error voltage to correctively position a movable element and controlling the speed of said one motor in accordance with the position of said movable element.

10. The combination set forth in claim 7 further characterized in that said movable element is a potentiometer element connected to control the speed of said one motor according to the position and voltage thereof, and said means for producing said second D. C. voltage is a second potentiometer having a movable member mechanically connected to said potentiometer element.

References Cited in the file of this patent

UNITED STATES PATENTS

| | | |
|---|---|---|
| 2,294,620 | Kiessling | Sept. 1, 1942 |
| 2,389,368 | King | Nov. 20, 1945 |
| 2,401,164 | King | May 28, 1946 |
| 2,488,412 | King et al. | Nov. 15, 1949 |
| 2,498,272 | Herchenroeder | Feb. 21, 1950 |